United States Patent
Pelic et al.

(10) Patent No.: US 12,227,060 B2
(45) Date of Patent: Feb. 18, 2025

(54) VEHICLE WEATHER STRIP FOR LIQUID DRAINAGE AND PREVENTION OF LIQUID INTRUSION INTO VEHICLE INTERIOR

(71) Applicant: Toyoda Gosei Co., Ltd., Kiyosu (JP)

(72) Inventors: Michael Christopher Pelic, Dearborn Heights, MI (US); Timothy Deitrick Wilson, Farmington Hills, MI (US); Sherri Ann Tregoning, Livonia, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 0 days.

(21) Appl. No.: 18/178,185

(22) Filed: Mar. 3, 2023

(65) Prior Publication Data

US 2024/0294057 A1 Sep. 5, 2024

(51) Int. Cl.
*B60J 10/25* (2016.01)
*B60J 10/27* (2016.01)
*B60J 10/86* (2016.01)

(52) U.S. Cl.
CPC ............ *B60J 10/25* (2016.02); *B60J 10/27* (2016.02); *B60J 10/86* (2016.02)

(58) Field of Classification Search
CPC ... B60J 10/25; B60J 10/21; B60J 10/27; B60J 10/86
See application file for complete search history.

(56) References Cited

U.S. PATENT DOCUMENTS

| | | | | |
|---|---|---|---|---|
| 4,492,405 A | * | 1/1985 | Chikaraishi | B60R 13/07 296/213 |
| 6,357,182 B1 | * | 3/2002 | Nozaki | B60J 10/86 49/489.1 |
| 7,073,294 B2 | * | 7/2006 | Yamaoka | B60J 10/80 49/475.1 |
| 10,626,665 B2 | * | 4/2020 | Amagai | E06B 7/2309 |
| 11,642,949 B2 | * | 5/2023 | Zia | B60R 13/07 277/549 |
| 2005/0028448 A1 | | 2/2005 | Mizutani et al. | |
| 2015/0007504 A1 | * | 1/2015 | Inai | B60J 10/84 49/483.1 |
| 2018/0298678 A1 | | 10/2018 | Amagai et al. | |
| 2021/0300166 A1 | * | 9/2021 | Kajita | B60J 10/25 |
| 2022/0080814 A1 | * | 3/2022 | Shimada | B60J 10/84 |

FOREIGN PATENT DOCUMENTS

JP 2007331730 A 12/2007

\* cited by examiner

*Primary Examiner* — Janet M Wilkens
*Assistant Examiner* — Susan M. Heschel
(74) *Attorney, Agent, or Firm* — Christopher G. Darrow; Darrow Mustafa PC

(57) ABSTRACT

A weather strip for a vehicle door includes a flow channel extending along at least a portion of the weather strip. A discharge portion is in fluid communication with the flow channel and is structured to enable a liquid to flow therealong from the flow channel to a location outside the flow channel. An end wall extends from a first side of the flow channel and is positioned to direct a liquid impinging on the end wall from the flow channel toward the discharge portion.

13 Claims, 10 Drawing Sheets

VEHICLE WEATHER STRIP FOR LIQUID DRAINAGE AND PREVENTION OF LIQUID INTRUSION INTO VEHICLE INTERIOR

TECHNICAL FIELD

The present invention relates to weather strips for vehicle doors and, more particularly, to a weather strip mountable in a margin between a vehicle door and door frame and structured for guiding excess moisture along the weather strip.

BACKGROUND

It is known to attach weather strips to vehicle doors and/or portions of the vehicle body to which the door is mounted, to prevent moisture and other contaminants from entering the vehicle along margins between door and vehicle body. Portions of the weather strip may be compressible between the door and the vehicle body when the door is completely closed, to provide the requisite contaminant barrier.

A problem may arise with some existing weather strip and/or vehicle door designs, wherein moisture may accumulate on the portion of the weather strip extending along (or parallel to) an uppermost edge of the door. For example, some weather strip designs may have pocket(s) or cavities that accumulate water impinging on the weather strip during a rainstorm when the door is completely closed. Due to the materials from which a weather strip is formed, moisture may also adhere to surfaces of the weather strip. When the door is opened and the weather strip is no longer compressed against the door frame, this trapped moisture may flow along the weather strip, off of the weather strip and into the occupant compartment. This may be exacerbated by vehicle door designs in which the door upper edge and the portion of the weather strip extending along (or parallel to) the door upper edge slope downwardly in a direction extending from the door rear edge toward the door forward edge, when the door is open. This downward slope may cause any moisture on the weather strip to flow into the occupant compartment when the door is opened.

SUMMARY

In one aspect of the embodiments described herein, a weather strip for a vehicle door is provided. The weather strip includes a flow channel extending along at least a portion of the weather strip. A discharge portion is in fluid communication with the flow channel and is structured to enable a liquid to flow therealong from the flow channel to a location outside the flow channel. An end wall extends from a first side of the flow channel and is positioned to direct a liquid impinging on the end wall from the flow channel toward the discharge portion.

In another aspect of the embodiments described herein, a vehicle door is provided. The door has an upper edge and incorporates a weather strip including a portion extending along the door adjacent the door upper edge and including a flow channel structured to guide a liquid flowing along the weather strip. The weather strip also has a discharge portion in fluid communication with the flow channel and through which a liquid flowing from the flow channel is guided away from the flow channel.

DETAILED DESCRIPTION

Figure 1:
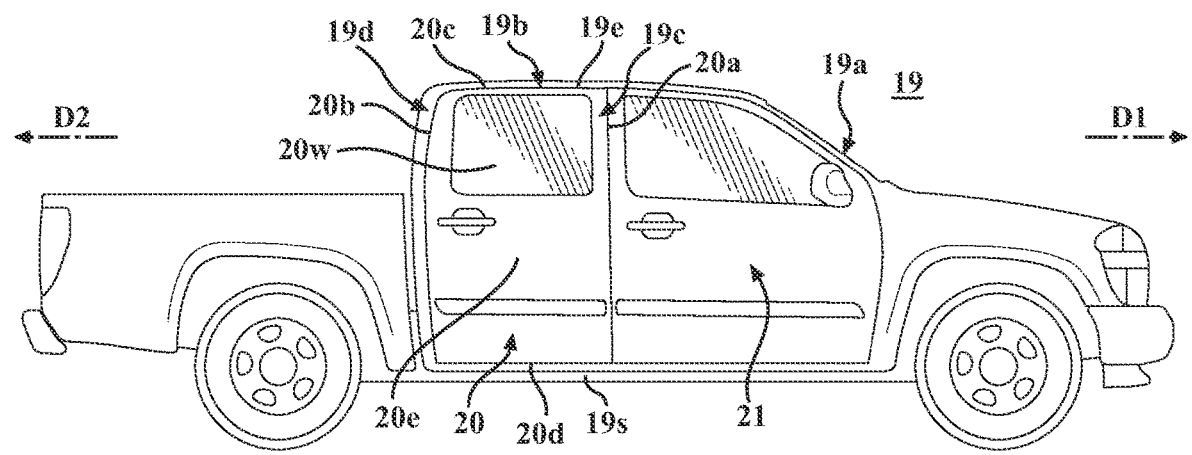
FIG. 1 is a schematic side view of a vehicle incorporating a side door including a weather strip (not shown) in accordance with an embodiment described herein.

Embodiments described herein relate to a weather strip for a vehicle door. The weather strip is mountable in a vehicle between the vehicle door and a door frame in which the door is mounted. The weather strip includes a flow channel extending along at least a portion of the weather strip. A discharge portion is in fluid communication with the flow channel and is structured to enable a liquid to flow therealong from the flow channel to a location outside the flow channel. An end wall extends from a first side of the flow channel to prevent liquid from flowing out of the flow channel into an occupant compartment of the vehicle. The end wall may also help guide a liquid impinging on the end wall from the flow channel toward the discharge portion. The weather strip is structured and attached to the door so as to seal the margin between the door and door frame. The flow channel also captures liquid from above the side rail when the door is completely closed. The portion of the weather strip including the flow channel is mounted on the door so as to facilitate a flow of liquid along the flow channel toward the discharge portion. The discharge portion discharges liquid received from the flow channel even when the door is completely closed.

It will be appreciated that for simplicity and clarity of illustration, where appropriate, reference numerals have been repeated among the different figures (or similar reference numerals have been provided) to indicate corresponding or analogous elements. Unless otherwise noted, similar reference numerals are used to describe similar features on separate elements and/or embodiments. In addition, numerous specific details are set forth in order to provide a thorough understanding of the embodiments described herein. However, it will be understood by those of ordinary skill in the art that the embodiments described herein can be practiced without these specific details.

Figure 2:
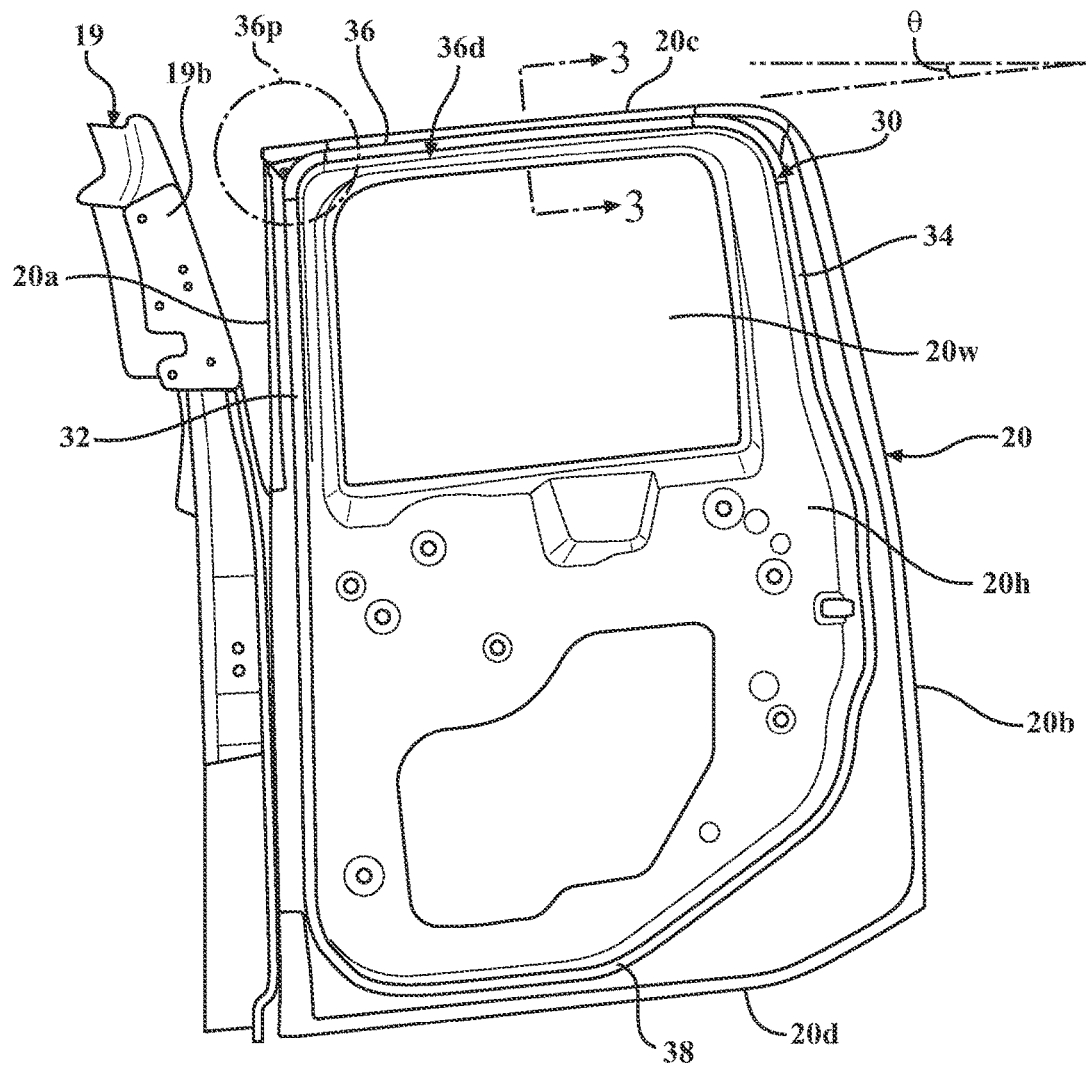
FIG. 2 is a schematic rear view of a portion of the vehicle of FIG. 1, showing the side door of FIG. 1 in an open condition and also showing an exemplary embodiment of a weather strip in accordance with an embodiment described herein

FIG. 1 is a schematic side view of a vehicle 19 incorporating a side door 20 including a weather strip (not shown) in accordance with an embodiment described herein. FIG. 1 shows the side door 20 in a completely closed condition. FIG. 2 is a schematic rear view of a portion of the vehicle 19 of FIG. 1, showing the side door 20 in an open condition and also showing an exemplary embodiment 30 of a weather strip in accordance with an embodiment described herein, mounted on surface(s) of the door 20 structured to face toward an occupant compartment of the vehicle when the door is completely closed. A body 19a of the vehicle 19 may define a door frame 19b in which the side door 20 is mounted.

An embodiment of the weather strip as described herein may be mounted to the side door 20 so that the weather strip is positioned between the side door 20 and the vehicle door frame 19b (or another portion of the vehicle body) when the door 20 is completely closed. As is known in the pertinent art, portions of the weather strip may be resiliently compressible between the door 20 and the door frame 19b when the door is completely closed, to provide a barrier or seal preventing moisture, dirt, and exhaust fumes from entering the vehicle occupant compartment along the margin between the vehicle door 20 and the door frame 19b. The weather strip may be structured to prevent migration of moisture in both liquid form and vapor form into the occupant compartment.

For purposes of this description, the side door 20 on which the weather strip is mounted is a rear side door of the vehicle 19. However, an embodiment of the weather strip may alternatively be mounted on the front side door 21. For the rear side door 20, the door frame 19b may be defined at least in part by a "B"-pillar structure 19c of the vehicle, a "C"-pillar structure 19d of the vehicle, a side rail structure 19e and a door lower sill structure 19s.

Referring to FIGS. 1 and 2, the vehicle door 20 may have a forward edge 20a (i.e., an edge of the door residing farthest in a forward direction D1 of the vehicle 19 when the door 20 is mounted on the vehicle 19 and in a completely closed condition as shown in FIG. 1). the door 20 may be considered "completely closed" or in a "completely closed condition" when the door is in a position where an actuatable latching mechanism (not shown) associated with the door 20 may be engaged to hold the door 20 in a closed condition suitable for safely driving the vehicle 19 along a ground surface.

The door 20 may also have a rear edge 20b positioned so as to reside opposite the forward edge 20a, toward a rearward direction D2 of the vehicle 19 opposite the forward direction D1, when the door 20 is in the completely closed condition. The door 20 may also have an upper edge 20c connecting the door forward edge 20a and the door rear edge 20b, along an uppermost portion of the door 20. The door 20 may also have a lower edge 20d connecting the door forward edge 20a and the door rear edge 20b, along a lowermost portion of the door 20. As shown in FIGS. 1 and 2, portions of the door upper edge 20c, forward edge 20a, rear edge 20b a body 20e of the door 20 may combine to define a frame for a vehicle window 20w. The door 20 may have an inner side 20h structured to face in a direction toward the vehicle occupant compartment when the door 20 is completely closed.

FIGS. 2-7 show one exemplary embodiment 30 of the weather strip mounted on the door 20. Some features common to all embodiments of the weather strip will now be described with reference to FIGS. 2-7. However, it will be understood that alternative embodiments of the weather strip may differ from weather strip 30 in other aspects, as described in greater detail herein.

In one or more arrangements, an embodiment of the weather strip mounted on the door 20 may be formed unitarily as a single piece, using a suitable extrusion or molding process, for example. In other arrangements, the weather strip may be constructed from multiple segments or pieces (not shown) formed separately and structured to be contiguously attachable to associated portions of the vehicle door 20 to form a continuous barrier. "contiguously attachable" means that each weather strip segment may be connected at each end thereof to another, adjacent segment along the door so as to provide a seal between the door and the vehicle body when the door 20 is completely closed, to prevent entry of moisture and other contaminants into the vehicle occupant compartment. The term "weather strip" as used herein will refer to a construction formed as a single piece structured to be attachable to the door 20 as shown in FIG. 2 to provide a barrier to the passage of contaminants through the weather strip when the door 20 is completely closed. The term "weather strip" as used herein will also refer collectively to a construction formed from separate segments configurable into an arrangement as shown in FIG. 2, to provide a barrier to the passage of contaminants therethrough when the door is completely closed.

Also, unless otherwise shown or described herein, portions of any embodiment of the weather strip may be structured to be attachable to the door 20 so as to extend along and/or generally parallel to the associated edges of the door 20. For example, referring to FIG. 2, a first portion 32 of the weather strip 30 may be structured to be attachable to the rear side door 20 so as to extend along and/or generally parallel to the door forward edge 20a. A second portion 34 of the weather strip 30 may be structured to be attachable to the side door 20 so as to extend opposite the weather strip first portion 32, along and/or generally parallel to the door rear edge 20b. A third portion 36 of the weather strip 30 may be structured to be attachable to the rear side door 20 so as to extend between the weather strip first portion 32 and second portion 34 and along and/or generally parallel to the door upper edge 20c. A fourth portion 38 of the weather strip 30 may be structured to be attachable to the rear side door 20 so as to extend between the weather strip first portion 32 and second portion 34 and generally along and/or parallel to the door lower edge 20d. Each of weather strip portions 32-38 may be structured and attached to the door 20 so as to ensure that the respective weather strip portion will engage an associated portion of the door frame (or another portion of the vehicle body 19a) to effect a seal between the weather strip 30 and the vehicle body as described herein.

Materials of manufacture and/or material surface finishes for the weather strip may include materials to which water has a relatively high adhesion, and also which are suitable for forming a seal or weather-stripping around openings on a vehicle. Possible materials include EPDM rubber, thermoplastic elastomer mixes of rubber and plastic, thermoplastic olefin polymer/filler blends, thermoplastic styrene polymer/filler blends, vinyl chloride resins, and any other suitable material. Portions of any embodiment of the weather strip may be attached to the door 20 using adhesives, mechanical fasteners, interference fits, and/or any other suitable method or methods.

Figure 3:
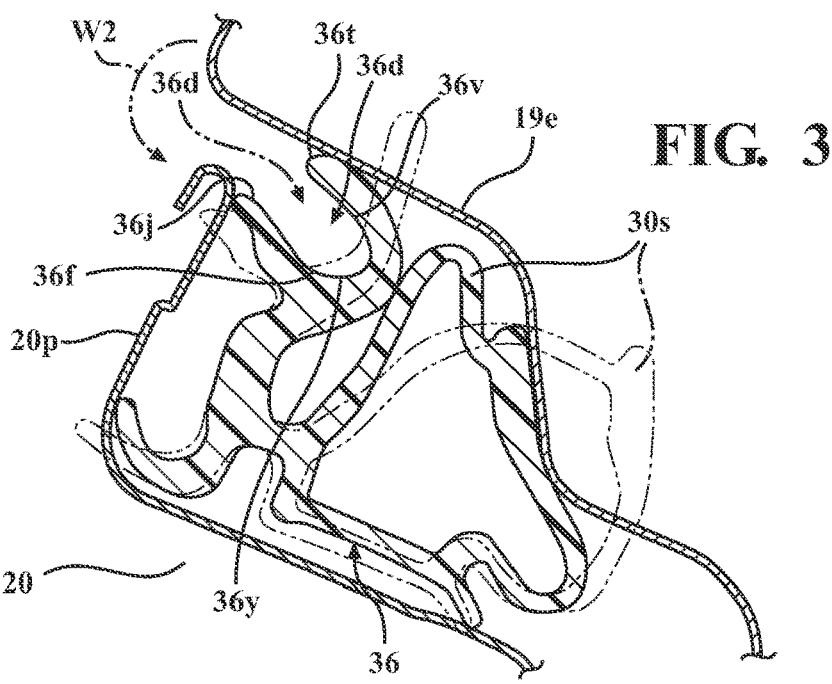
FIG. 3 is a schematic cross-sectional view of a portion of the weather strip shown in FIG. 2, structured to be attachable to the side door so as to extend along a door upper edge, in accordance with an embodiment described herein.

Each portion of the weather strip 30 attached to the door 20 may include an associated sealing portion. Each sealing portion may be compressible between the door 20 and the door frame/vehicle body when the door is completely closed, to provide an associated barrier or seal as previously described. For example, FIG. 3 shows a schematic cross-sectional view of the portion 36 of the weather strip 30 structured to be attachable to the door 20 so as to extend along the door upper edge 20c, in accordance with an embodiment described herein. The third portion 36 of the weather strip 30 includes a sealing portion 30s. FIG. 3 shows the weather strip third portion 36 attached to the door 20 with the door completely closed. The sealing portion 30s is shown in an undeformed state in phantom lines (occurring when the door is open) and in a resiliently deformed state in solid lines (occurring when the door is completely closed). As seen from FIG. 3, when the door 20 is completely closed, the sealing portion 30s may be resiliently deformed by contact with the side rail structure 19e to form a seal therebetween.

Sealing portions similar to sealing portion 30s may extend along the lengths of the other weather strip portions 32, 34, 38 previously described. Also, similar sealing portions may extend along the entire lengths of the other embodiments 130, 230, 330 of the weather strip described herein.

In addition, to enable removal of as much accumulated moisture as possible from the weather strip prior to opening the door, and to help prevent intrusion of liquid from the weather strip into the vehicle occupant compartment when the door is opened, the portion of each weather strip structured to extend along the door upper edge 20c may incorporate a drainage portion connected to the associated sealing portion. For example, the portion 36 of the weather strip 30 attached to the door 20 along door upper edge 20c may include a drainage portion (generally designated 36d) connected to associated sealing portion 30s.

Each drainage portion of a weather strip may include an associated flow channel extending therealong. for example, referring again to FIG. 3, drainage portion 36d of weather strip 30 includes a flow channel 36f structured to extend between the door rear edge 20b and the door forward edge 20a when the weather strip 30 is attached to the door 20. The flow channel may have a first side 36v, a second side 36j opposite the first side 36v, and a concave portion 36y extending between the first and second sides for receiving liquid therein. Similar flow channels may be formed in the associated drainage of the other weather strip embodiments 130, 230, 330 described herein.

The flow channel 36f may be structured to collect liquids and suspended contaminants migrating downwardly from the side rail structure 19e or otherwise impinging on the weather strip along the margin between the door 20 and the side rail structure 19e. The flow channel 36f may be structured to direct a flow of this liquid along the weather strip third portion 36 to an associated discharge portion of the drainage portion 36p. The flow channel 36f may extend along the entire length (or along substantially the entire length) of the third portion 36 of the weather strip 30.

Figure 4:
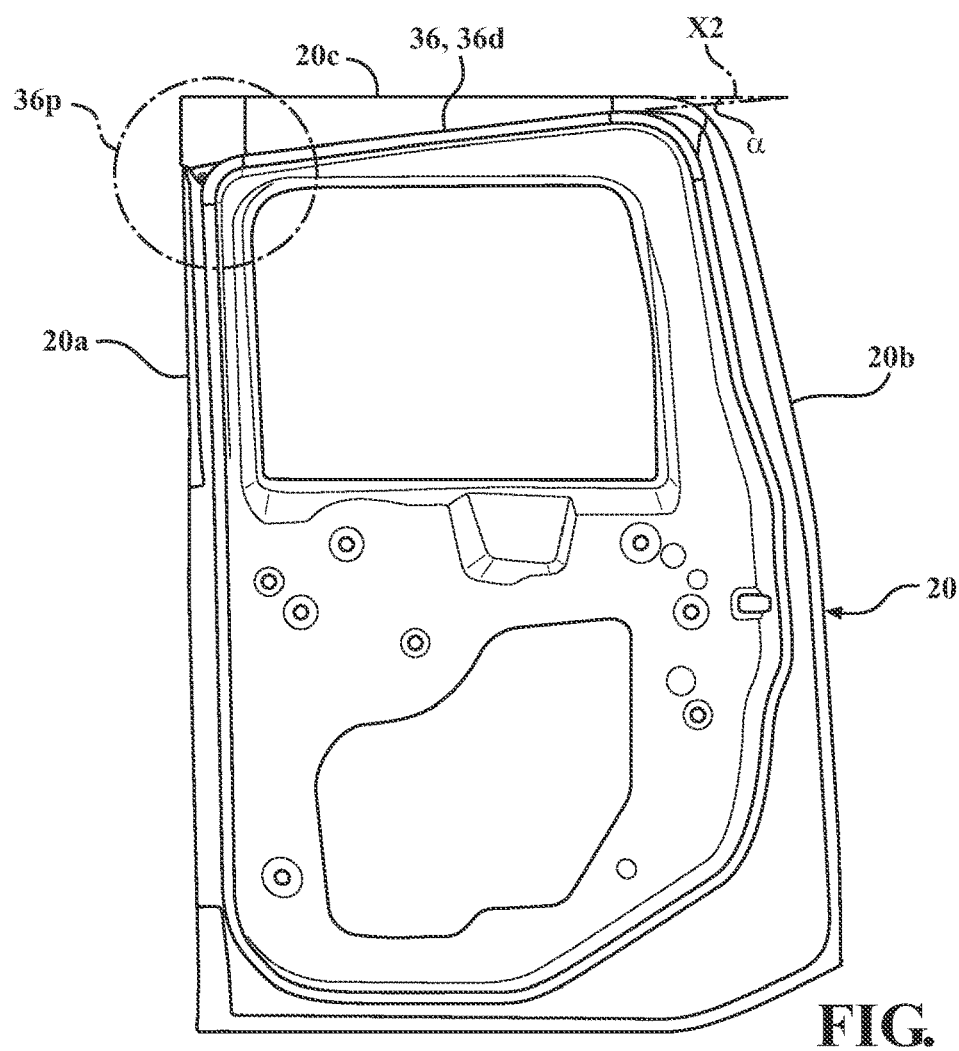
FIG. 4 is a schematic view of a side of the door of FIG. 1 facing toward the occupant compartment and when the door is completely closed.

In addition, in the embodiments described herein, the weather strip may be structured and attached to the door 20 so as to cause a liquid in the flow channel to flow along the flow channel while the door is completely closed. For example, FIG. 4 is a schematic view of a side of the door 20 facing toward the occupant compartment and when the door is completely closed. To urge a liquid in the flow channel 36f to flow downwardly when the door 20 is completely closed, the third portion 36 of the weather strip 30 may be structured and attached to the door 20 along upper edge 20c so as to slope downwardly at an angle α with respect to a horizontal plane X2, in a direction extending from the door rear edge 20b toward the door forward edge 20a when the door 20 is completely closed. This helps ensure that the liquid will flow downwardly along the flow channel 36f toward the discharge portion 36p as described herein, even when the door 20 is completely closed, so that liquid may be discharged from the discharge portion 36p when the door is completely closed.

Also, in one or more arrangements, the door upper edge 20c may be structured so as to slope downwardly in a direction extending from the door rear edge 20b toward the door forward edge 20a, when the door 20 is in at least partially open. For example, as seen in FIG. 2, the door upper edge 20c is shown sloping downwardly at an angle θ with respect to a horizontal plane X1. This slope θ of the door upper edge 20c may be in addition to the slope α of the flow channel when the door 20 is completely closed. For purposes of determining a downward sloping direction of the door upper edge 20c, the door 20 may be considered to be at least partially open when the door is sufficiently open so that the door rear edge 20b and the associated portion 34 of the weather strip 30 are spaced apart from door frame 19b.

In embodiments described herein, the portion of the weather strip structured to extend along the door upper edge 20c may also include a side wall extending from a first side of the flow channel and structured to seal against a portion of the vehicle body when the door is completely closed. As used herein, the terms "seal against" and "sealing against" mean that the side wall is compressible or otherwise deformable responsive to contact with the vehicle body when the door is completely closed, so as to form a seal with the vehicle body preventing liquid from migrating past the side wall/vehicle body contact interface. For example, FIGS. 3 and 4 show a side wall 36t extending from a first side 36v of the flow channel 36f. Side wall 36t is deflected by side rail structure 19e when the door 20 is completely closed, causing the side wall 36t to seal against the side rail structure 19e (or another portion of the vehicle body) when the door 20 is completely closed.

The side wall 36t may prevent moisture from reaching sealing portion 30s, which may be in fluid communication with the occupant compartment. the side wall 36t may also prevent moisture from entering and collecting in a space between the side wall 36t and the sealing portion 30s, thereby confining the moisture to a side of the side wall 36t along which the flow channel 36f and drainage portion reside. This facilitates confinement and drainage of all the moisture impinging on the weather strip third portion 36. The side wall 36t is shown in an undeformed state in phantom lines (occurring when the door is open) and in a resiliently deformed state in solid lines (occurring when the door is completely closed).

Also, as seen in FIG. 3, flow channel second side 36*j* may seal against the side door panel 20*p* (or another portion of the door) to form a seal therebetween when the weather strip 30 is attached to the door 20. The flow channel second side 36*j* is shown in an undeformed state in phantom lines (occurring prior to attachment of the weather strip 30 to the door 20) and in a resiliently deformed state in solid lines (occurring when the weather strip 30 to the door 20). The seals formed by resilient deformation of the flow channel second side 36*j* and the side wall 36*t* may help ensure that moisture W2 flowing off of the side rail structure is directed into the flow channel 36*f*.

Figure 5:
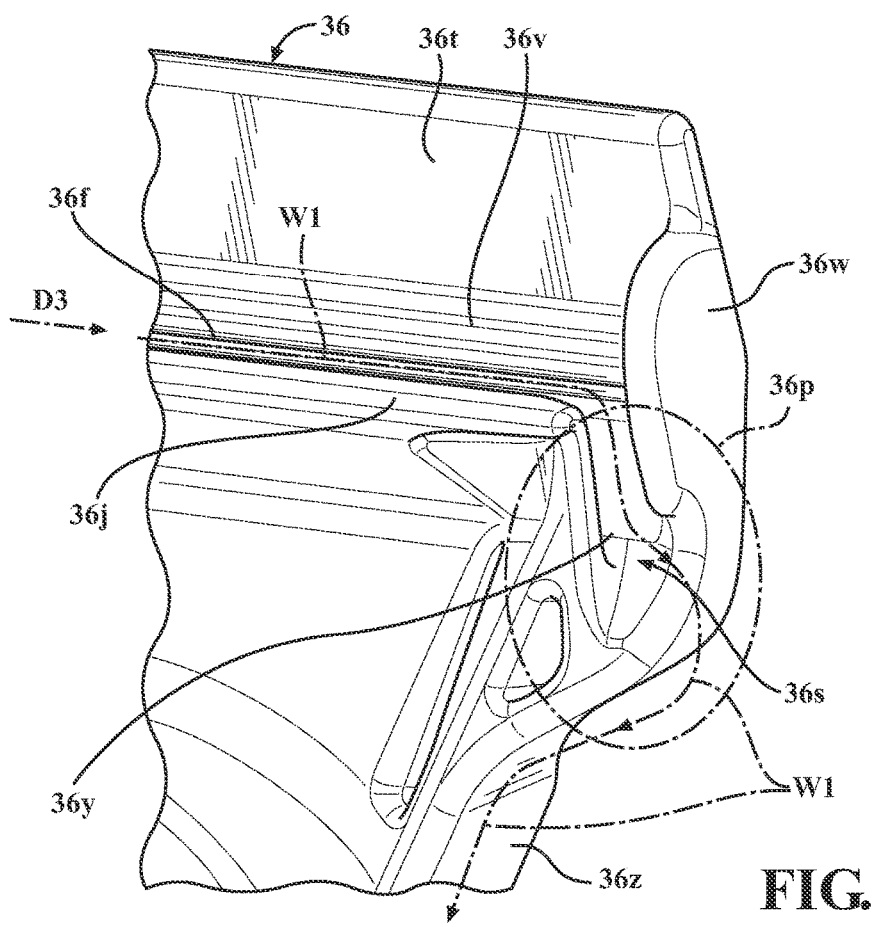
FIG. 5 is a schematic perspective view of a discharge portion of a weather strip in accordance with a first embodiment described herein.
Figure 6:
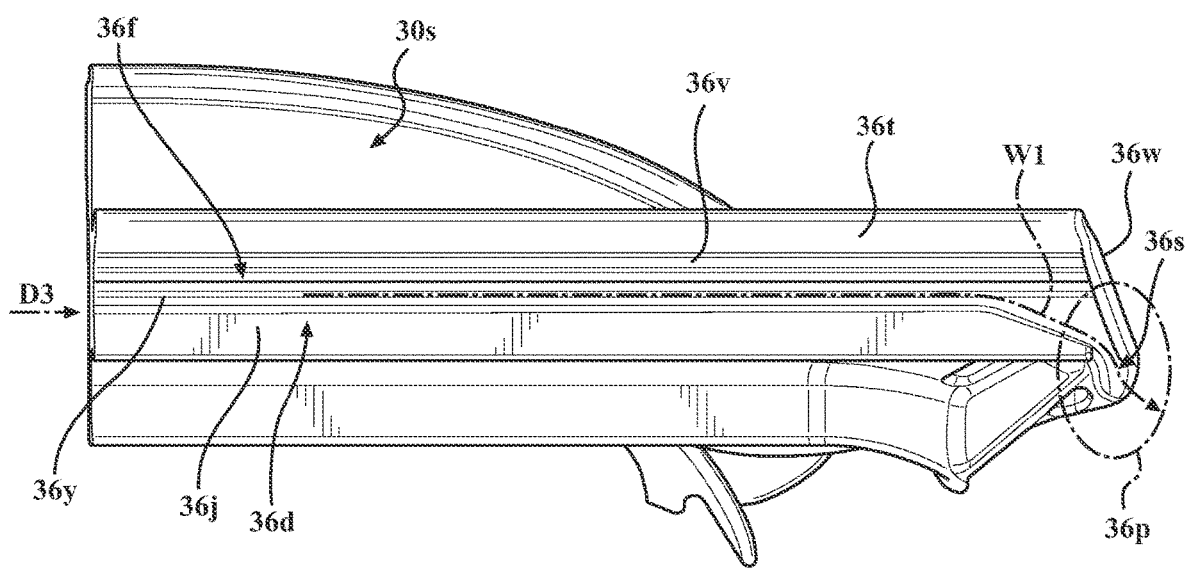
FIG. 6 is a schematic plan view of a portion (including the discharge portion) of the weather strip shown in FIG. 5.
Figure 7:
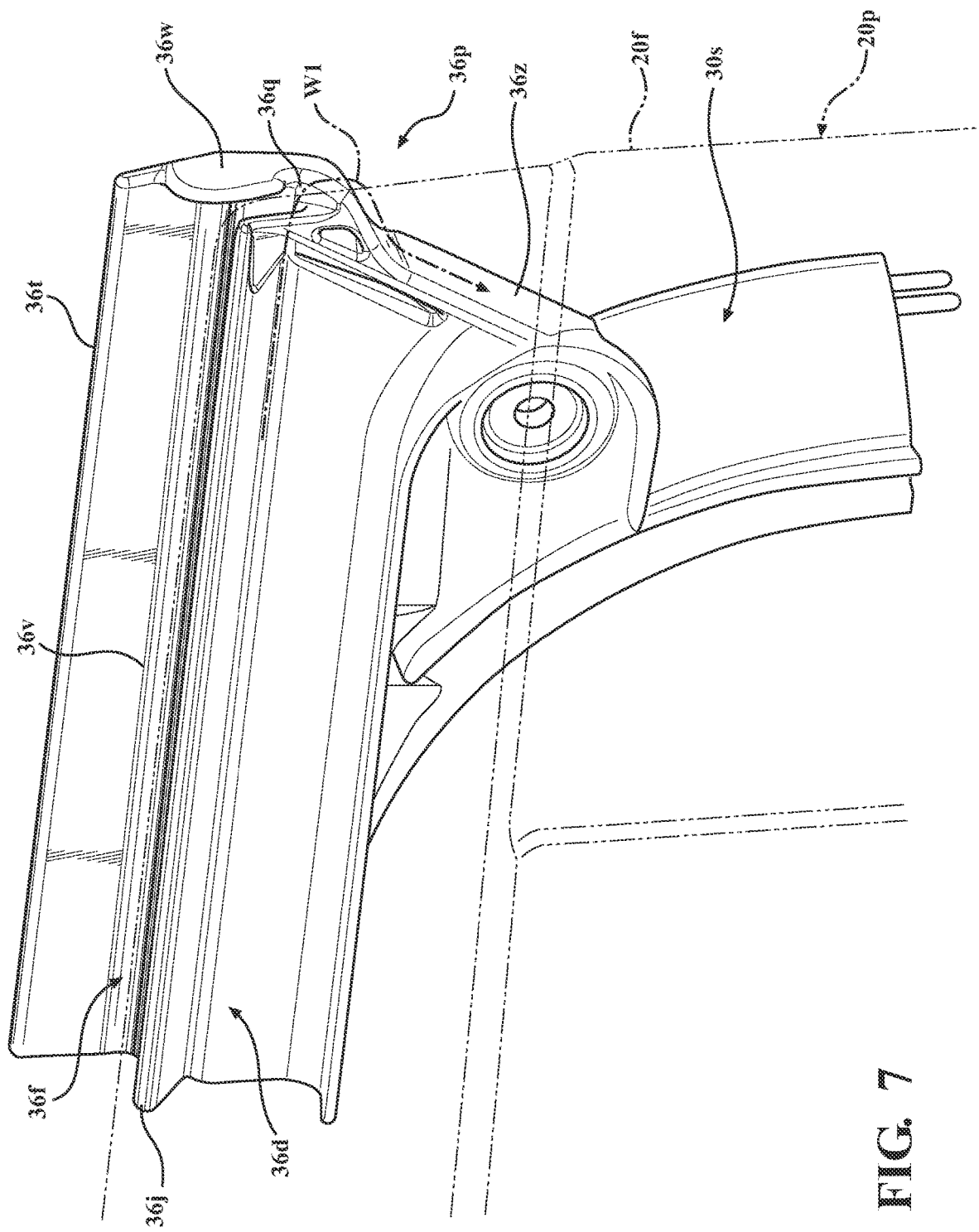
FIG. 7 is a schematic perspective view of the portion of the weather strip shown in FIGS. 5 and 6, and showing the relative position of a door panel to which the weather strip is attached.

The drainage portion of each weather strip described herein may also include an end wall extending from the first side of the flow channel and positioned to direct a liquid impinging on the end wall from the flow channel toward a discharge portion of the drainage portion. Also, as seen in the drawings, the side wall and end wall may intersect each other and may be formed as a single piece with each other in embodiments of the weather strip described herein. for example, FIGS. 5-7 show an end wall 36*w* extending from a first side 36*v* of the flow channel 36*f* and positioned to direct a liquid impinging on the end wall (in direction D3) from the flow channel 36*f* toward the discharge portion 36*p*. End wall 36*w* intersects side wall 36*t*. Side wall 36*t* may also extend past an edge of the end wall 36*w* for purposes of sealing against a vehicle side rail structure or another portion of the vehicle, as described elsewhere herein.

The end wall 36*w* may be structured to slow down and bleed momentum from a liquid flowing along the flow channel 36*f* in direction D3 toward the vehicle occupant compartment when the door 20 is opened, while simultaneously directing the liquid toward the discharge portion 36*p*. The end wall 36*w* may also be structured to prevent a flow of liquid out of the end of the flow channel 36*f* and into the occupant compartment.

Each drainage portion of a weather strip described herein may also include a discharge portion in fluid communication with the flow channel and structured to enable a liquid to flow therealong from the flow channel to a location outside the flow channel. The discharge portion may be located at or near an end of the associated flow channel. For example, FIGS. 2, 5, and 6 show a discharge portion (generally designated 36*p*) located at an end of flow channel 36*f*. Referring to FIGS. 2, 5, and 6, the discharge portion 36*p* may be located generally at or near where the third portion 36 of the weather strip 30 intersects the first portion 32 of the weather strip. The discharge portion 36*p* may provide a drainage path for moisture off of that portion 36 of the weather strip 30 which may otherwise deposit the accumulated liquid into the occupant compartment when the door 20 is opened.

In one or more arrangements, the weather strip 30 may be structured to discharge a liquid from the flow channel through a passage 36*s* formed between a side 36*j* of the flow channel and the end wall 36*w*. in one or more particular arrangements, as seen in FIG. 7, the discharge portion 36*p* may be structured to direct at least a portion of the liquid in a direction from the flow channel 36*f* toward a panel 20*p* of the door. The liquid may then discharge through an opening 36*q* defined by the end wall 36*w* and the door panel 20*p*.

In one or more arrangements, the discharge portion may have a forward face structured to face in a forward direction of the vehicle 19 when the door 20 is completely closed. For example, referring to FIGS. 5 and 7, the discharge portion 36*p* includes a forward face 36*z* structured to face in a forward direction of the vehicle 19 when the door 20 is completely closed. In one or more arrangements, as seen in FIGS. 5 and 7, the discharge portion 36*p* may be structured to direct at least a portion of the liquid along the forward face 36*z* of the discharge portion 36*p*, in the direction indicated by arrow W1. Because the momentum of the liquid flowing along the flow channel 36*f* has been reduced by the end wall 36*w* and because the size of the opening 36*q* defined by the end wall 36*w* and the door panel 20*p* may be restricted to limit the flowrate of liquid therethrough, liquid may flow through the opening 36*q* at a speed low enough so that it does not leave the surfaces of the discharge portion 36*p* and enter the occupant compartment. Rather, the liquid exiting through the opening 36*q* may adhere to the discharge portion 36*p*, flowing down the forward face 36*z*. When the liquid reaches an end of the forward face 36*z*, it may drop vertically off of the forward face 36*z* and away from the discharge portion 36*p* and/or it may continue adhering to the discharge portion 36*p*, flowing onto the first portion 32 of the weather strip 30 extending along the door forward edge 20*a* and then further downwardly along this portion of the weather strip.

As described above, all embodiments of the weather strip described herein may include a flow channel, an end wall, and a side wall as described herein. All embodiments of the weather strip may also include an associated discharge portion. However, the structure of the discharge portion may be distinctive to each of the embodiments 30, 130, 230, 330 of the weather strip described herein.

Figure 8:
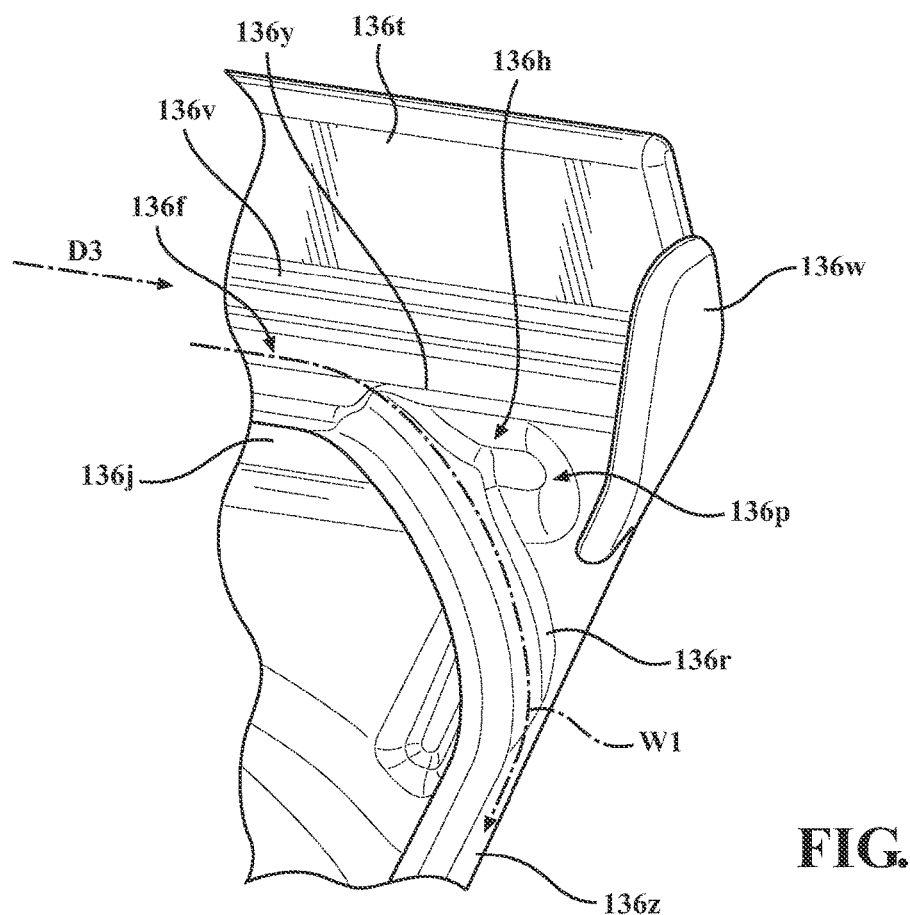
FIG. 8 is a schematic perspective view of a discharge portion of a weather strip in accordance with a second embodiment described herein.
Figure 9:
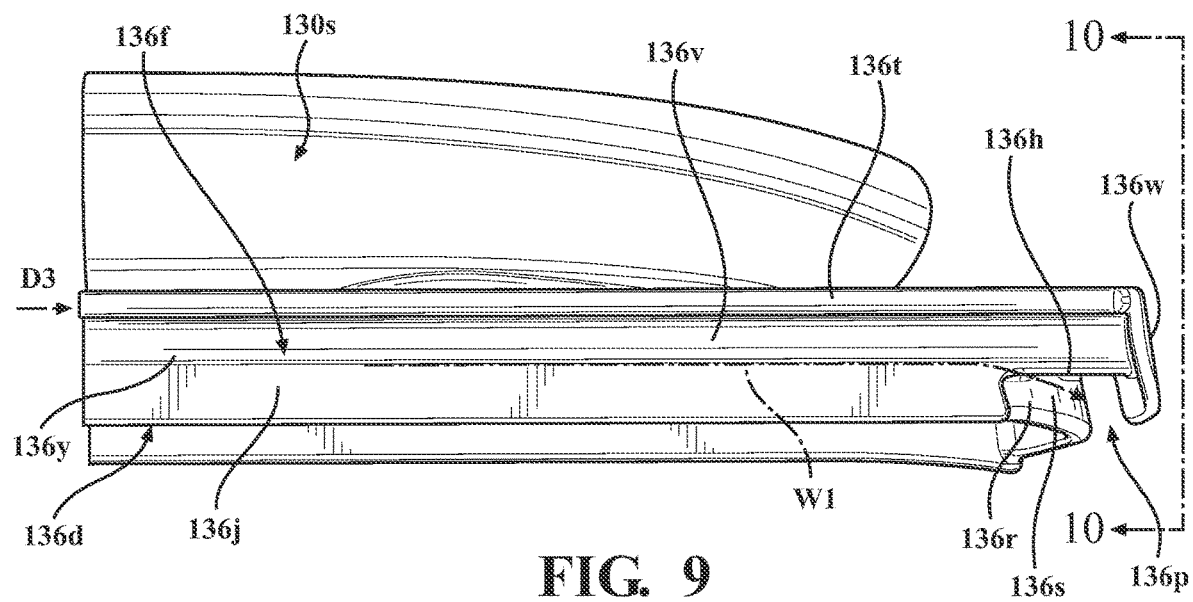
FIG. 9 is a schematic plan view of a portion (including the discharge portion) of the weather strip shown in FIG. 8.
Figure 10:
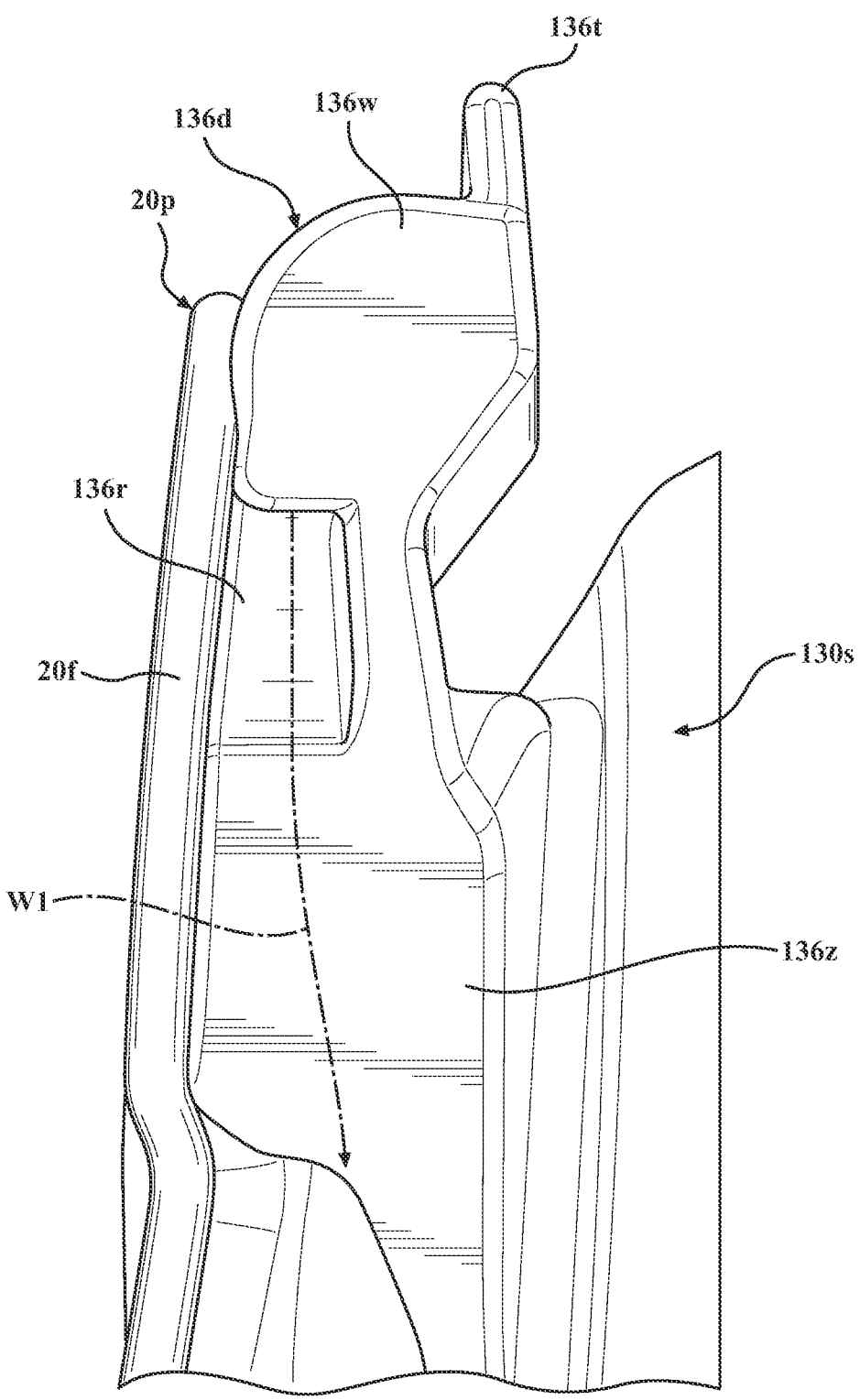
FIG. 10 is a schematic end view of the discharge portion of the weather strip shown in FIGS. 8 and 9.

FIGS. 8-10 illustrate an alternative embodiment 130 of the weather strip. The weather strip 130 may be structured and attached to the door in the same manner as the weather strip 30 previously described, except that the structure of the discharge portion 136*p* of weather strip 130 may be different from the structure of discharge portion 36*p*.

Referring to FIGS. 8-10, the weather strip 130 may have a flow channel 136*f*, a side wall 136*t*, an end wall 136*w*, and a discharge portion (generally designated 136*p*). To guide liquid in a direction away from the flow channel 136*f*, discharge portion 136*p* of weather strip 130 may include a through-hole 136*h* formed along the liquid flow channel 136*f* and structured to enable fluid communication between the flow channel 136*f* and the location outside the flow channel.

As seen in FIGS. 8-10, the through-hole 136*h* may be open or unbounded along one edge or side 136*s* thereof by any portion of the weather strip 130. As seen in FIG. 10, this open side of the through-hole 136*h* may be blocked by the door panel 20*p* when the weather strip 130 is attached to the door, thereby closing all sides of the through-hole. In one or more arrangements, the through-hole may be positioned so that a liquid blocked by impinging on the end wall 136*w* passes through the through-hole 136*h* after being blocked by the end wall. In one or more particular arrangements, the end wall 136*w* may be positioned so as to define an edge of the through-hole 136*h*.

In addition, a ramp portion 136*r* may be structured to extend downwardly from the flow channel 136*f* and the through-hole 136*h* when the weather strip 130 is mounted on a vehicle door as previously described. The ramp portion 136*r* may be structured to guide a flow of liquid away from the flow channel 136*f*. In particular arrangements, the ramp portion 136*r* may be structured to guide a flow of liquid downwardly from the flow channel 136*f* toward a forward face 136*z* of the discharge portion along the direction indicated by arrow W1 when the door 20 is mounted on a vehicle. The liquid may then adhere to (and flow along) the forward face 136*z* as previously described.

Figure 11:
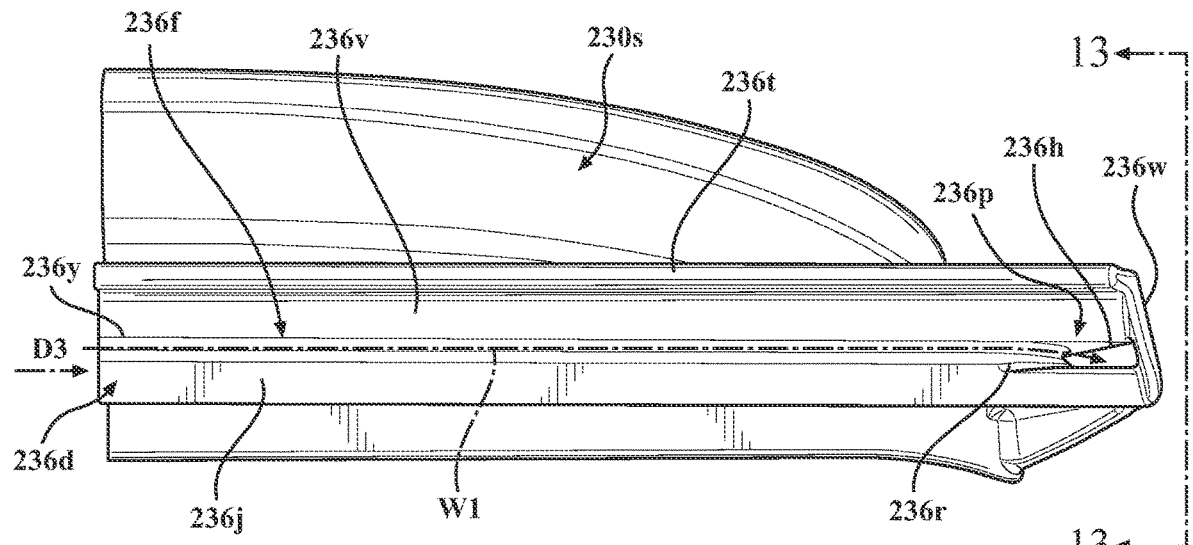
FIG. 11 is a schematic plan view of a portion (including a discharge portion) of a weather strip in accordance with a third embodiment described herein.
Figure 12:
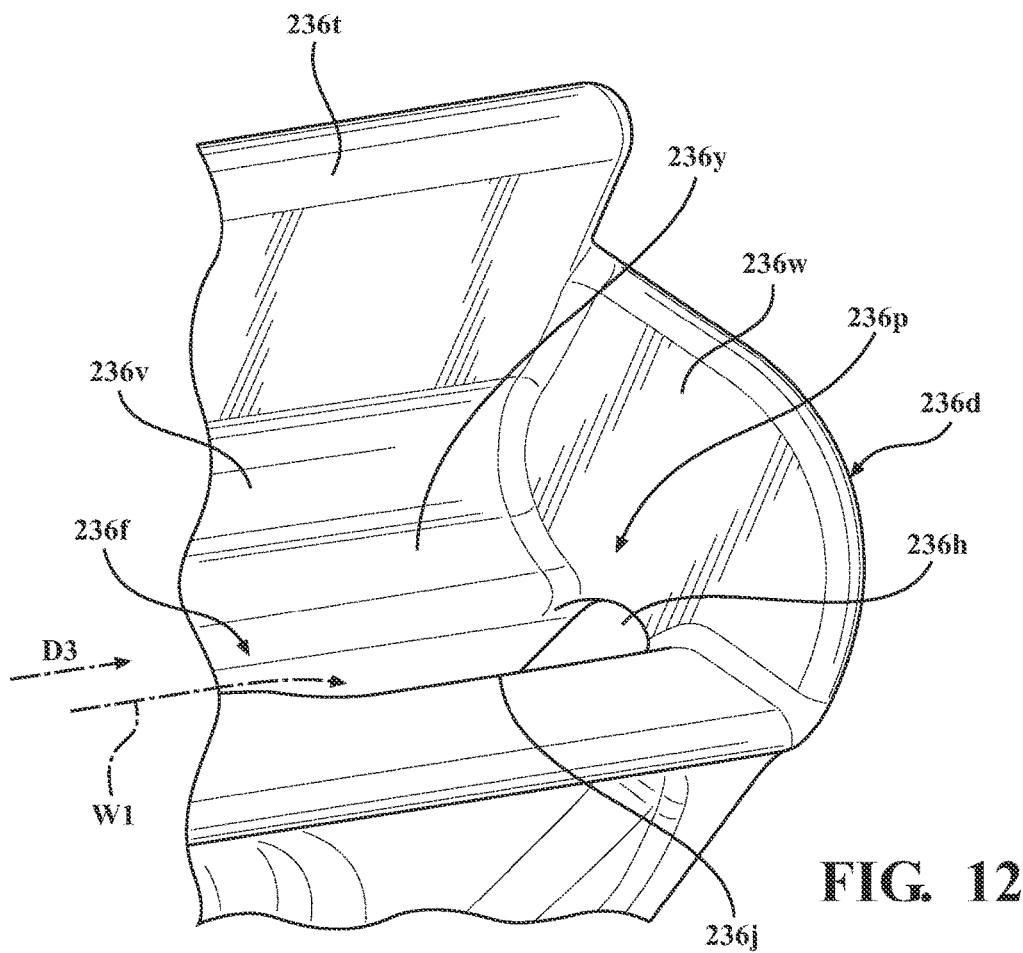
FIG. 12 is a schematic perspective view of the discharge portion of the weather strip shown in FIG. 11.
Figure 13:
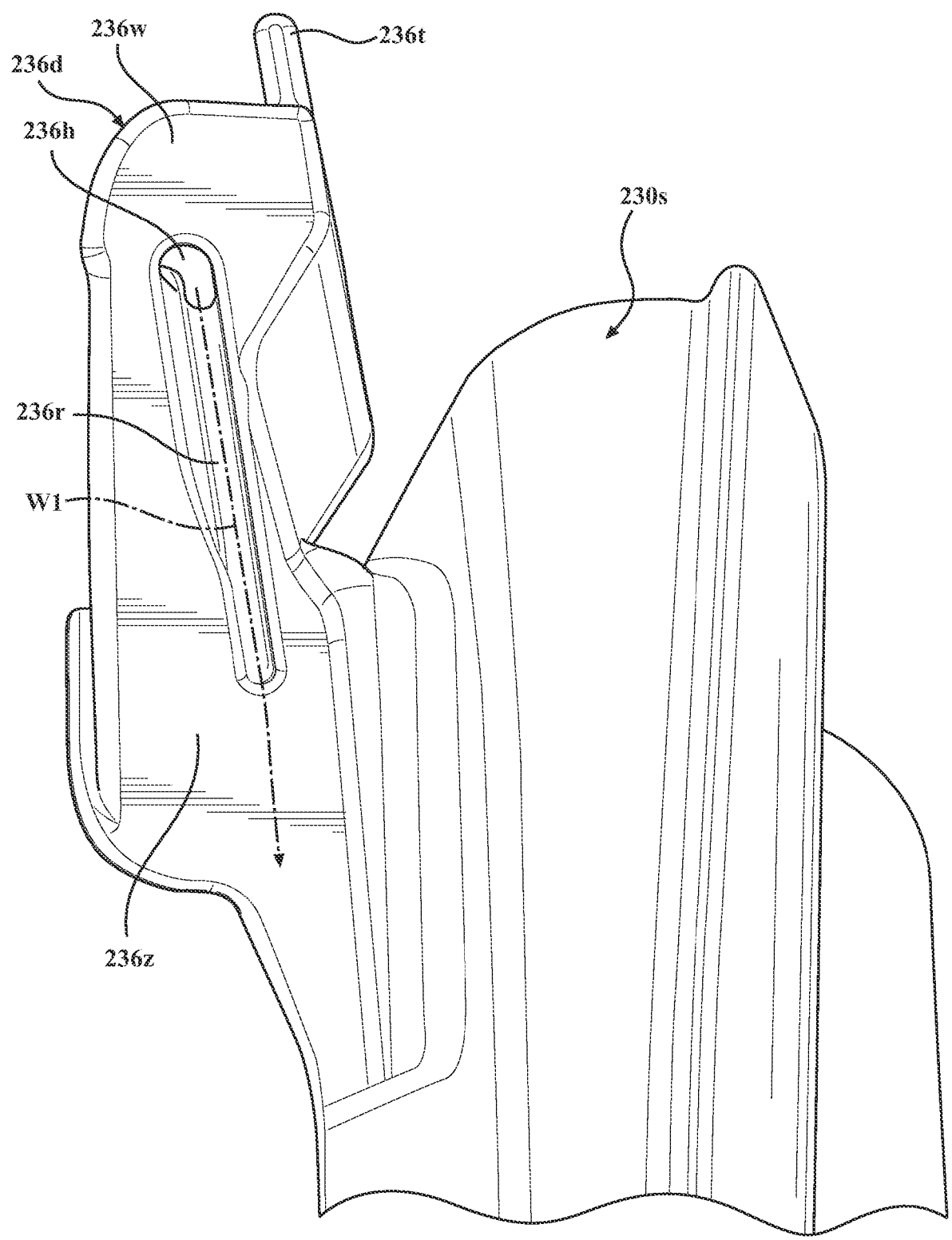
FIG. 13 is a schematic end view of the discharge portion of the weather strip shown in FIGS. 11 and 12.

FIGS. 11-13 illustrate another alternative embodiment 230 of the weather strip. The weather strip 230 may be structured and attached to the door in the same manner as the weather strips 30 and 130 previously described, except that the structure of the discharge portion 236p of weather strip 230 may be different from the structures of discharge portions 36p and 136p.

Referring to FIGS. 11-13, the weather strip 230 may have a flow channel 236f, a side wall 236t, an end wall 236w, and a discharge portion (generally designated 236p). To guide liquid in a direction away from the flow channel 236f, discharge portion 236p of weather strip 230 may include a through-hole 236h formed along the liquid flow channel 236f and structured to enable fluid communication between the flow channel 236f and the location outside the flow channel. The through-hole 236h may be structured similarly to the through-hole 136h of weather strip 130 except that, whereas the through-hole 136h is open along one side or edge thereof as shown in FIGS. 8 and 10, the through-hole 236h is enclosed or bounded on all sides by other portions of the weather strip 230.

In one or more arrangements, the through-hole 236h may be positioned so that a liquid blocked by impinging on the end wall 236w passes through the through-hole 236h after being blocked by the end wall. In one or more particular arrangements, the end wall 236w may be positioned so as to define an edge of the through-hole 236h. In addition, a ramp portion 236r may be structured to extend downwardly from the flow channel 236f and the through-hole 236h when the weather strip 230 is mounted on a vehicle door as previously described. The ramp portion 236r may be structured to guide a flow of liquid away from the flow channel 236f. In particular arrangements, the ramp portion 236r may be structured to guide a flow of liquid downwardly from the flow channel 236f toward a forward face 236z of the discharge portion along the direction indicated by arrow W1 when the door 20 is mounted on a vehicle. The liquid may then adhere to (and flow along) the forward face 236z as previously described.

Figure 14A:
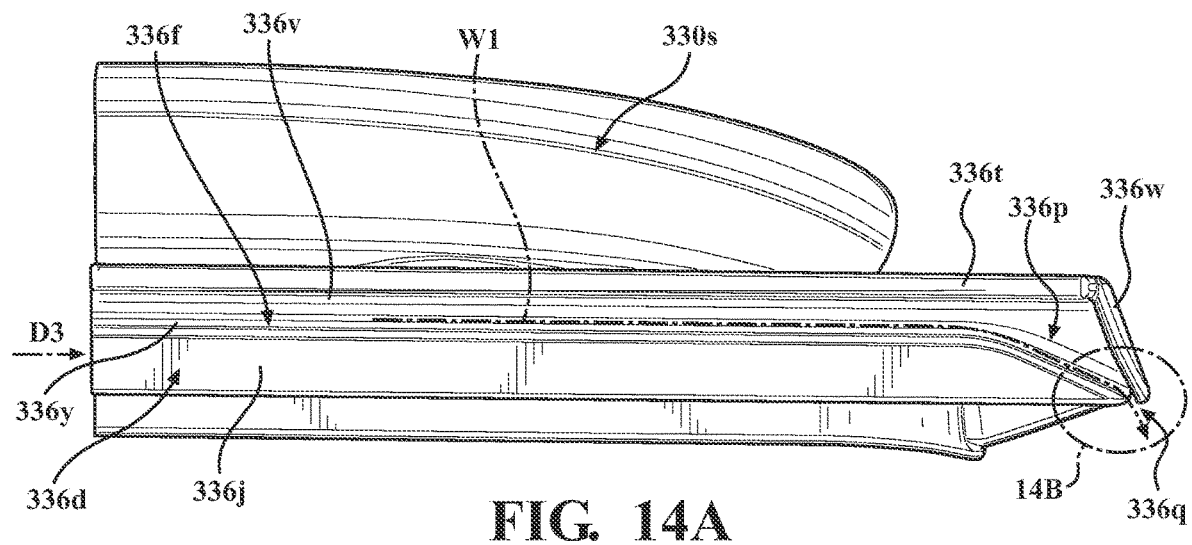
FIG. 14A is a schematic plan view of a portion (including a discharge portion) of a weather strip in accordance with a fourth embodiment described herein.
Figure 14B:
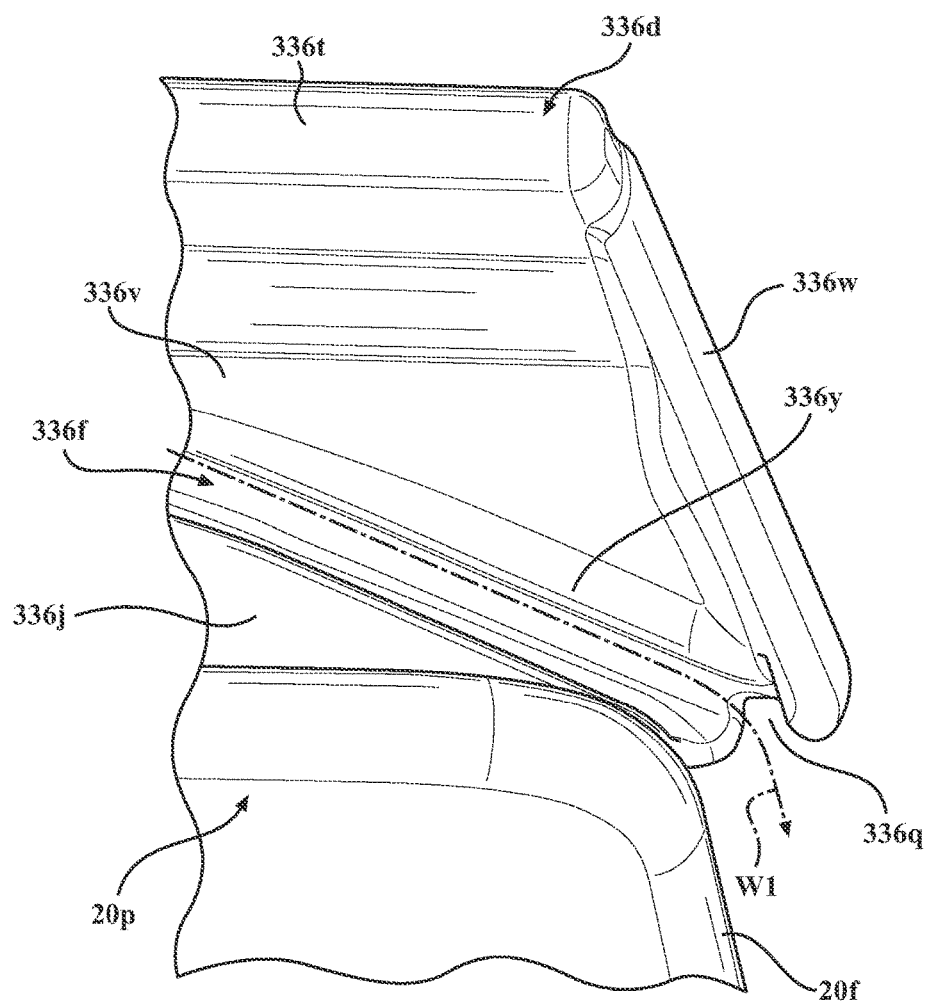
FIG. 14B is a magnified view of part of the discharge portion of the weather strip shown in FIG. 14A and showing the relative position of a door panel to which the weather strip is attached.
Figure 15:
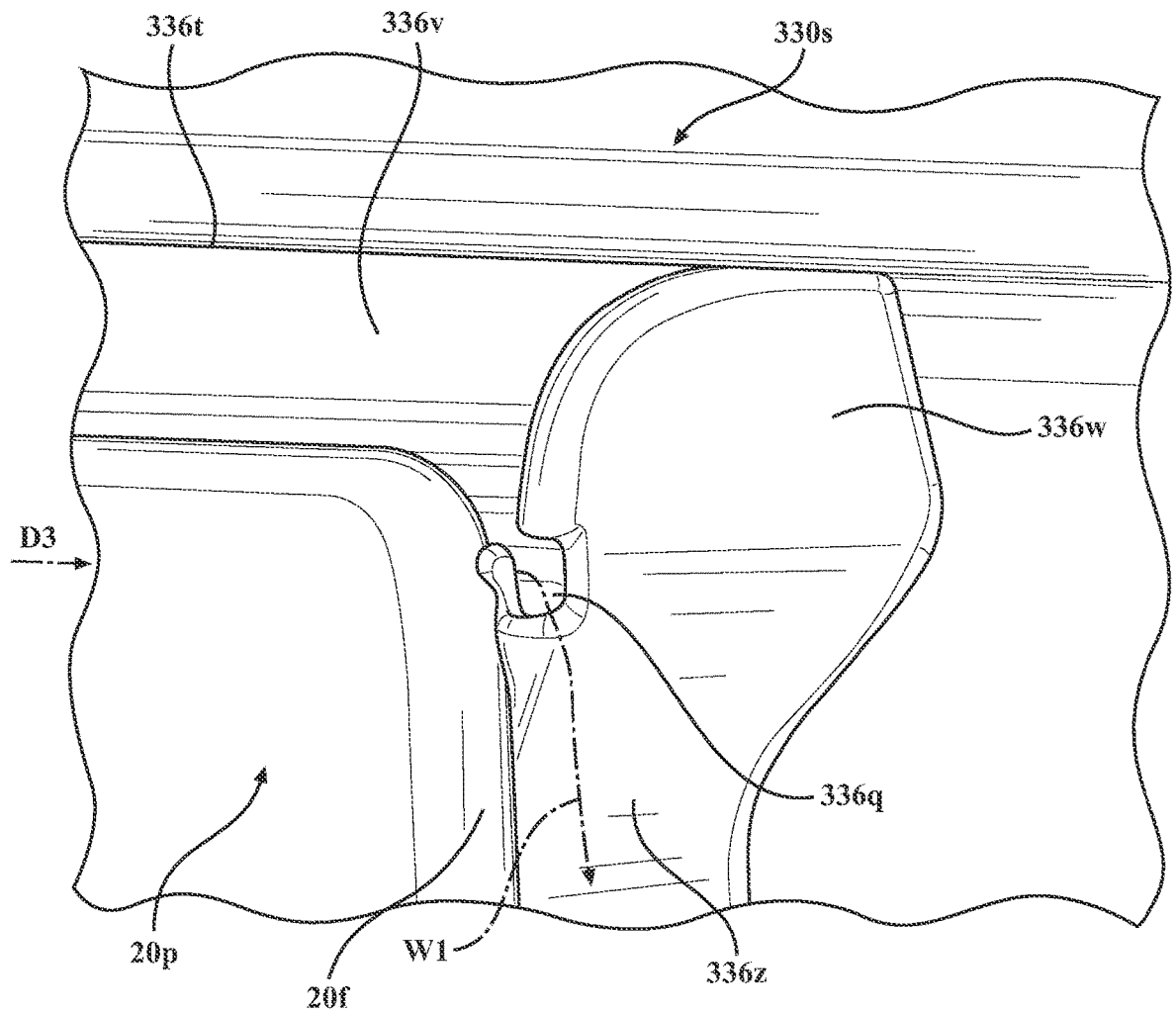
FIG. 15 is a schematic perspective view of the discharge portion of the weather strip shown in FIGS. 14A and 14B and showing the relative position of a door panel to which the weather strip is attached.

FIGS. 14A-15 illustrate yet another alternative embodiment 330 of the weather strip. The weather strip 330 may be structured and attached to the door in the same manner as the weather strips 30, 130, and 230 previously described, except that the structure of the discharge portion 336p of weather strip 330 may be different from the structures of the other discharge portions 36p, 136p, and 236p.

Referring to FIGS. 14A-15, the weather strip 330 may have a flow channel 336f, a side wall 336t, an end wall 336w, and a discharge portion (generally designated 336p). The discharge portion 336p may include a notch or opening 336q formed in the end wall 336w. Also, the end wall 336w and the flow channel 336f may be structured to direct the flow of liquid from the flow channel 336f through the notch 336q to a location outside the flow channel 336f. As seen in FIG. 15, the weather strip 330 may be structured so that liquid being discharged through the notch 336q flows from the notch downwardly along the forward face 336z of the discharge portion 336p (or downwardly along another portion of the weather strip 330).

In addition, as seen in FIGS. 14B and 15, the discharge portion 336p may be structured to discharge a flow of liquid from the flow channel 336f at a location forward of a forward edge 20f of a panel 20p of the vehicle door 20. Furthermore, as seen in FIGS. 14A and 14B, the flow channel 336f may be structured to curve in a direction away from the side wall 336t (and toward door panel 20p) as the flow channel 336f extends toward the end wall 336w.

In another aspect of the embodiments described herein, a vehicle door may be provided. The door may include an upper edge and an embodiment of a weather strip as described herein. The weather strip may have a portion extending along the door adjacent the upper edge and including a flow channel structured to guide a liquid flowing along the weather strip. The weather strip may also have a discharge portion in fluid communication with the flow channel and through which a liquid flowing from the flow channel is guided away from the flow channel.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A weather strip for a vehicle door, the weather strip comprising:
   a flow channel extending along at least a portion of the weather strip;
   a discharge portion including a through-hole formed along the flow channel and structured to enable a liquid to flow therealong from the flow channel to a location outside the flow channel, the through-hole being structured to direct at least a portion of the liquid along a forward face of the discharge portion; and
   an end wall extending from a first side of the flow channel and defining an edge of the through-hole, the end wall being positioned to direct a liquid impinging on the end wall from the flow channel toward the through-hole,
   wherein the discharge portion forward face is structured so that liquid reaching an end of the discharge portion forward face flows onto a first portion of the weather strip extending along a forward edge of the vehicle door and then further downwardly along the first portion of the weather strip.

2. The weather strip of claim 1, wherein the through-hole is structured to discharge a liquid from the flow channel through a passage formed between a side of the flow channel and the end wall.

3. The weather strip of claim 1, wherein the discharge portion comprises a ramp portion extending from the flow channel and the through-hole, the ramp portion being structured to guide a flow of liquid away from the flow channel.

4. The weather strip of claim 1, wherein the through-hole is bounded on all sides by other portions of the weather strip.

5. A vehicle door comprising:
an upper edge; and
a weather strip in accordance with claim 1 and having a portion extending along the door adjacent the door upper edge and including the flow channel.

6. The vehicle door of claim 5, wherein the door includes:
a rear edge extending from the door upper edge; and
a forward edge extending from the door upper edge opposite the door rear edge,
and wherein the portion of the weather strip extending along the door adjacent the door upper edge is mounted to the door so as to slope downwardly in a direction extending from the door rear edge toward the door forward edge when the door is mounted on a vehicle and is completely closed.

7. The vehicle door of claim 6, wherein the door upper edge is structured so as to slope downwardly in a direction extending from the door rear edge toward the door forward edge, when the door mounted on a vehicle and is at least partially open.

8. The vehicle door of claim 5, wherein the weather strip is structured and attached to the door so as to cause a liquid in the flow channel to flow along the flow channel while the door is in completely closed.

9. The vehicle door of claim 5, further comprising a side wall extending from a side of the flow channel and structured to seal against a portion of a body of the vehicle when the door is completely closed.

10. A weather strip for a vehicle door, the weather strip comprising:
a flow channel extending along at least a portion of the weather strip;
an end wall extending from a first side of the flow channel;
a discharge portion including a notch formed in the end wall, wherein the end wall and the flow channel are structured to direct a flow of liquid from the flow channel through the notch to a location outside the flow channel, the discharge portion being structured to direct at least a portion of the liquid along a forward face of the discharge portion so that liquid reaching an end of the forward face flows onto a first portion of the weather strip extending along a forward edge of the vehicle door and then further downwardly along the first portion of the weather strip.

11. The weather strip of claim 10, further comprising a side wall extending from a side of the flow channel and intersecting the end wall.

12. The weather strip of claim 11, wherein the flow channel is structured to curve in a direction away from the side wall as the flow channel extends toward the end wall.

13. A vehicle door comprising a weather strip in accordance with claim 5, wherein the discharge portion is structured to discharge a flow of liquid from the flow channel at a location forward of a forward edge of a panel of the door.

* * * * *